US009751427B2

United States Patent
Loftus

(10) Patent No.: US 9,751,427 B2
(45) Date of Patent: Sep. 5, 2017

(54) VEHICLE TRACTION BATTERY THERMAL CONDITIONING

(71) Applicant: FORD GLOBAL TECHNOLOGIES, LLC, Dearborn, MI (US)

(72) Inventor: Michael Edward Loftus, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/475,627

(22) Filed: Sep. 3, 2014

(65) Prior Publication Data

US 2016/0059732 A1    Mar. 3, 2016

(51) Int. Cl.
| | |
|---|---|
| B60L 9/00 | (2006.01) |
| B60L 11/00 | (2006.01) |
| G05D 1/00 | (2006.01) |
| G06F 7/00 | (2006.01) |
| G06F 17/00 | (2006.01) |
| B60L 11/18 | (2006.01) |
| H02J 7/00 | (2006.01) |

(52) U.S. Cl.
CPC ....... *B60L 11/1875* (2013.01); *B60L 11/1866* (2013.01); *H02J 7/0014* (2013.01); *H02J 7/0016* (2013.01); *H02J 7/0091* (2013.01); *Y02T 10/7005* (2013.01); *Y02T 10/7061* (2013.01); *Y10S 903/907* (2013.01)

(58) Field of Classification Search
CPC ....... H01M 2010/4271; H01M 10/482; H01M 2/348; H01M 2010/4278; H01M 10/4264; H01M 10/4207; H01M 10/486; H01M 10/425; H01M 2200/103; H01M 2220/20; H01M 2/34; Y02T 10/7044; Y02T 90/16; Y02T 10/705; Y02T 10/7005; B60L 11/1861; B60L 2240/545; B60L 11/1879; Y10T 29/49002
USPC ............... 701/22; 307/9.1; 429/62; 29/592.1
See application file for complete search history.

(56) References Cited

U.S. PATENT DOCUMENTS

| | | | |
|---|---|---|---|
| 4,591,692 A | 5/1986 | Wightman | |
| 5,599,636 A | 2/1997 | Braun | |
| 6,152,597 A * | 11/2000 | Potega | G01K 1/02 324/104 |

(Continued)

FOREIGN PATENT DOCUMENTS

| | | |
|---|---|---|
| CN | 102208700 A | 10/2011 |
| DE | 3340882 C1 | 6/1985 |

OTHER PUBLICATIONS

Rueil-Malmaison; HV Battery Thermal Management for PHEV & EV; Dec. 7, 2011; pp. 1-32.

(Continued)

*Primary Examiner* — Jaime Figueroa
(74) *Attorney, Agent, or Firm* — David B. Kelley; Brooks Kushman P.C.

(57) ABSTRACT

A vehicle traction battery includes a plurality of battery cells and a battery energy control module (BECM) for charge-balancing the plurality of battery cells. The BECM is disposed within the vehicle traction battery and includes circuitry having at least one positive temperature coefficient component, such as a thermistor or silistor, connected to at least one of the plurality of battery cells for thermal conditioning of the plurality of battery cells.

19 Claims, 4 Drawing Sheets

(56) References Cited

U.S. PATENT DOCUMENTS

| | | | | |
|---|---|---|---|---|
| 7,471,066 B2* | 12/2008 | Ambrosio | | H02J 7/0014 320/110 |
| 7,615,966 B2* | 11/2009 | Houldsworth | | H02J 7/0016 320/118 |
| 7,772,799 B2* | 8/2010 | Wu | | B60L 3/0046 320/104 |
| 8,242,745 B2* | 8/2012 | Zhang | | H02J 7/0016 320/103 |
| 8,426,047 B2* | 4/2013 | Emori | | H02J 7/0019 307/10.1 |
| 8,786,261 B2* | 7/2014 | Andrea | | H02J 7/0016 320/152 |
| 8,933,721 B2* | 1/2015 | Deboy | | G01R 31/025 307/43 |
| 2006/0022646 A1 | 2/2006 | Moore et al. | | |
| 2006/0091857 A1* | 5/2006 | Nakanishi | | B60L 11/1851 320/116 |
| 2006/0210868 A1 | 9/2006 | Kim et al. | | |
| 2010/0121511 A1* | 5/2010 | Onnerud | | B60L 11/1851 701/22 |
| 2011/0117463 A1* | 5/2011 | Lienkamp | | H01M 10/0525 429/433 |
| 2011/0157755 A1* | 6/2011 | Honkura | | H01M 10/4235 361/93.8 |
| 2011/0210703 A1* | 9/2011 | Souza | | H02J 7/0019 320/136 |
| 2012/0068545 A1* | 3/2012 | Shim | | H01M 10/425 307/80 |
| 2012/0129013 A1* | 5/2012 | Lee | | H01M 10/4207 429/7 |
| 2012/0242144 A1* | 9/2012 | Chorian | | H01M 2/34 307/9.1 |
| 2013/0237955 A1* | 9/2013 | Neta | | A61M 5/14248 604/500 |
| 2014/0022681 A1* | 1/2014 | Mitsutani | | B60L 3/0038 361/86 |
| 2014/0042972 A1* | 2/2014 | Kim | | H02J 7/0016 320/118 |
| 2014/0216709 A1* | 8/2014 | Smith | | B60H 1/00642 165/287 |
| 2014/0225622 A1* | 8/2014 | Kudo | | B60L 3/0046 324/433 |
| 2014/0266038 A1* | 9/2014 | Gibeau | | B60L 11/1875 320/109 |
| 2014/0287293 A1* | 9/2014 | Gross | | H01M 10/5083 429/120 |
| 2015/0072190 A1* | 3/2015 | Bober | | H01M 10/4257 429/62 |
| 2015/0073632 A1* | 3/2015 | Hill | | B60W 20/10 701/22 |
| 2015/0229011 A1* | 8/2015 | Gless | | B60L 11/1874 62/3.2 |

OTHER PUBLICATIONS

Andreas Vlahinos and Ahmad A. Pesaran; Energy Efficient Battery Heating in Cold Climates; 2001; pp. 1-8.

* cited by examiner

VEHICLE TRACTION BATTERY THERMAL CONDITIONING

TECHNICAL FIELD

This disclosure relates to conditioning of a vehicle battery using components within the battery pack to improve the battery current delivery at low ambient temperatures.

BACKGROUND

Extreme low ambient temperatures, such as −30° C. (−22° F.) and below, for example, diminish the ability of a vehicle traction battery to deliver current to the motor of an electric or hybrid vehicle. Thermal conditioning of the battery improves performance in low ambient temperatures.

Various strategies have been used to provide battery thermal conditioning, many of which require external interfaces (electrical, fluid, or air) to warm the battery pack. One such method uses a positive thermal coefficient (PTC) resistive element disposed adjacent the outside of the battery in a position to heat the battery. This method requires a separate heater positioned to heat the battery and a PTC resistive element for each battery cell. Another strategy for heating a vehicle battery uses a secondary battery module having a housing that surrounds the battery to allow a heat transfer medium to flow in and out of the housing. This approach requires a large battery module and the use of a heat transfer medium. Another strategy includes a battery warmer having a positive temperature coefficient device attached to a side of the battery. Yet another approach includes an interior battery temperature sensor that controls current flow for a heating element secured to a cooling plate within the battery interior.

SUMMARY

A vehicle traction battery includes a plurality of battery cells and a battery energy control module (BECM) for controlling various functions of the traction battery. The BECM is disposed within the vehicle traction battery and includes circuitry having at least one positive temperature coefficient component, such as a thermistor or silistor, connected to at least one of the plurality of battery cells for thermal conditioning of the plurality of battery cells.

In one embodiment, a vehicle, such as an electric vehicle, a hybrid vehicle, or a plug-in hybrid electric vehicle, includes an electric motor powered by a vehicle traction battery. The vehicle traction battery includes a plurality of battery cells connected to a control module disposed within the traction battery. The control module includes battery cell charge-balancing circuitry associated with the plurality of battery cells. The charge-balancing circuitry includes positive temperature coefficient devices to provide thermal conditioning to the plurality of battery cells in response to a current applied to the charge-balancing circuitry. The positive temperature coefficient devices may be implemented by appropriately selected thermistors or silistors, for example. The battery control module may be configured to activate the charge-balancing circuitry in response to ambient or battery cell temperature being below an associated threshold to provide battery thermal conditioning.

Embodiments may also include a vehicle having an electric motor/generator in communication with a traction battery. The traction battery includes a plurality of battery cells, a plurality of thermistors disposed with the traction battery, and a battery control module disposed within the traction battery and in communication with the plurality of battery cells and the plurality of thermistors. The battery control module is configured to supply current from the plurality of battery cells to the plurality of thermistors to provide battery thermal conditioning. In various embodiments, the thermistors are implemented by switching thermistors. The thermistors may be connected within corresponding charge balancing circuits, each associated with corresponding ones of the plurality of battery cells.

Various advantages are associated with various embodiments of this disclosure. For example, embodiments of this disclosure utilize existing charge-balance circuitry in combination with positive temperature coefficient (PTC) devices inside the battery pack to achieve temperature dependent thermal conditioning of the traction battery. Replacing some or all of the resistors used for charge balancing in a Battery Energy Control Module (BECM) with PTC devices, such as PTC thermistors or silicon resistors (silistors), allows more charge-balance current to flow at extreme low temperatures, thus generating more heat via the $I^2R$ power loss in the BECM. Various embodiments may include PTC devices arranged in parallel or in a parallel and series resistive circuit with other resistive devices and/or diodes to achieve the desired range of resistances and currents for charge balancing and thermal conditioning. To condition the battery pack at extremely low temperatures, the BECM may activate one or more of the charge-balance circuits. Use of PTC devices provides temperature self-regulation in combination with the temperature control provided by the BECM.

DETAILED DESCRIPTION

As required, representative detailed embodiments are described; however, it is to be understood that the disclosed embodiments are merely exemplary and other embodiments are within the scope of the disclosure although they may not be explicitly described or illustrated. The figures are not necessarily to scale; some features may be exaggerated or minimized to show details of particular components. Therefore, specific structural and functional details are not to be interpreted as limiting, but merely as a representative basis for teaching one skilled in the art to variously employ the embodiments within the scope of the disclosure.

Figure 1:
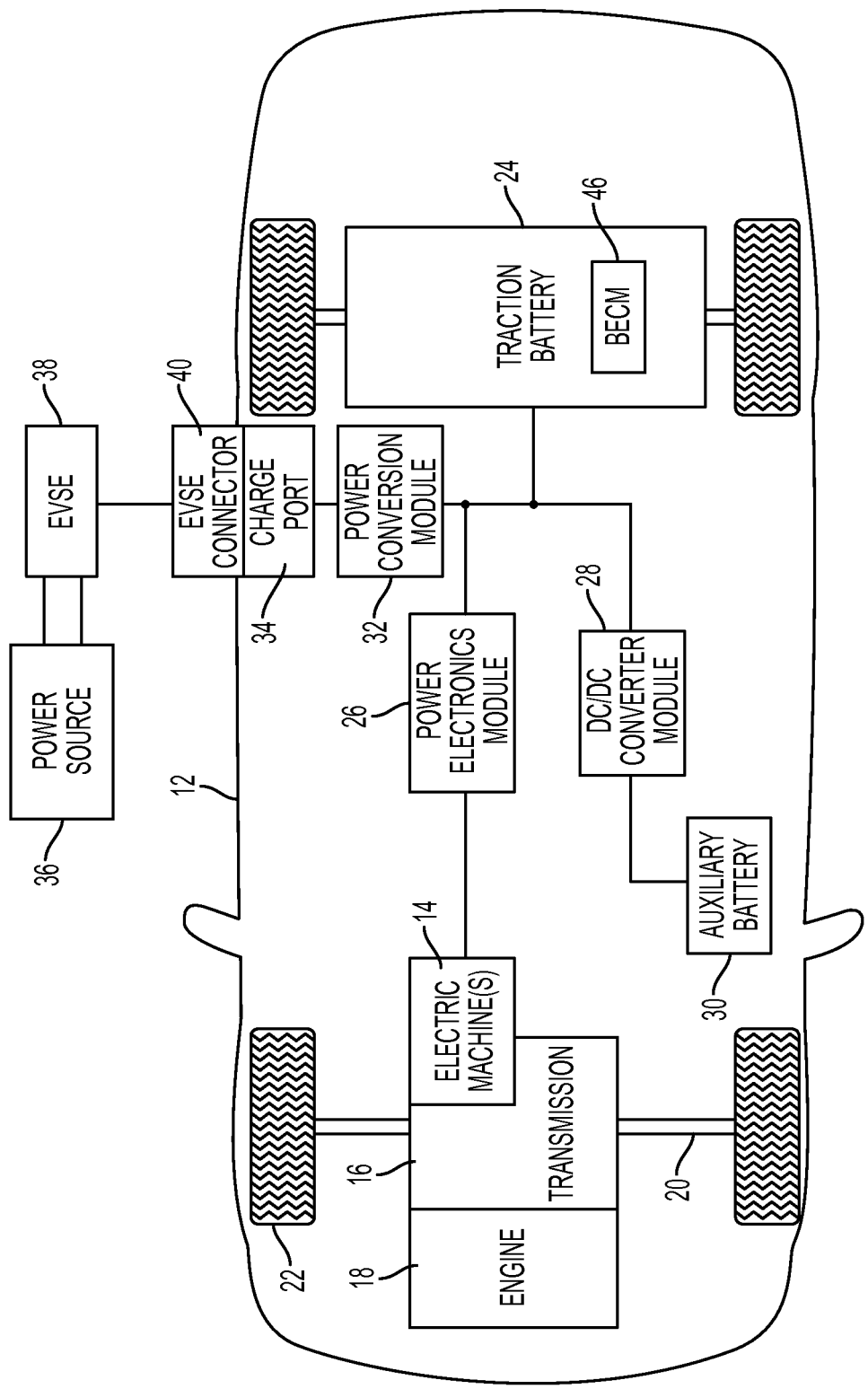
FIG. 1 is a block diagram of a representative vehicle application for embodiments of a traction battery pack having PTC devices for battery thermal conditioning according to this disclosure.

FIG. 1 depicts a representative application incorporating traction battery thermal conditioning using PTC devices in a plug-in hybrid-electric vehicle (HEV). Those of ordinary skill in the art will recognize that battery thermal conditioning using PTC devices within the battery pack may be used in various electric, hybrid, and plug-in hybrid vehicles that may be operated in low ambient temperature environments. A plug-in hybrid-electric vehicle 12 may comprise one or more electric machines 14 mechanically connected to a hybrid transmission 16. The electric machines 14 may be capable of operating as a motor or a generator. For hybrid vehicles, a transmission 16 is mechanically connected to an internal combustion engine 18. The transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. Similar advantages may be obtained with an electric vehicle that does not include an internal combustion engine 18.

A traction battery or battery pack 24 stores energy that can be used by the electric machines 14. A vehicle battery pack 24 typically provides a high voltage DC output. The traction battery 24 is electrically connected to one or more power electronics modules. One or more contactors (not shown) may isolate the traction battery 24 from other components when opened, and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may be omitted as previously described.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric cabin or component heaters, may be connected directly to the high-voltage without the use of a DC/DC converter module 28. The low-voltage systems may be electrically connected to an auxiliary battery 30 (e.g. a 12V or 24V battery).

Embodiments of this disclosure may include vehicles such as vehicle 12, which may be a hybrid or range-extender hybrid, or an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

The various components illustrated in FIG. 1 may have one or more associated controllers to control and monitor the operation of the components. The controllers may communicate via a serial bus (e.g., Controller Area Network (CAN)) or via discrete conductors. One or more controllers may also operate in a stand-alone manner without communication with one or more other controllers. As described in greater detail with reference to FIGS. 2 and 3, one of the controllers may be implemented by a Battery Energy Control Module (BECM) 46 to control various charging and discharging functions and battery cell charge balancing, for example. The BECM may be positioned within traction battery pack 24 and include one or more PTC components within a charge balancing circuit to provide battery thermal conditioning during charge balancing. PTC components may include PTC thermistors, sometimes referred to as posistors, and/or silistors, for example. PTC components or devices have an increasing resistance as a function of increasing temperature. When a current flows through a PTC device, the resistance losses generate heat that may raise the temperature of the device and adjacent components, which results in increased resistance and associated lower current flow such that the devices have a self-regulating characteristic. Most PTC thermistors are of the "switching" type, which means that their resistance rises suddenly at a certain critical temperature. Silistors are similarly constructed and operate on the same principles as other thermistors, but employ silicon as the semi-conductive component material.

Figure 2:
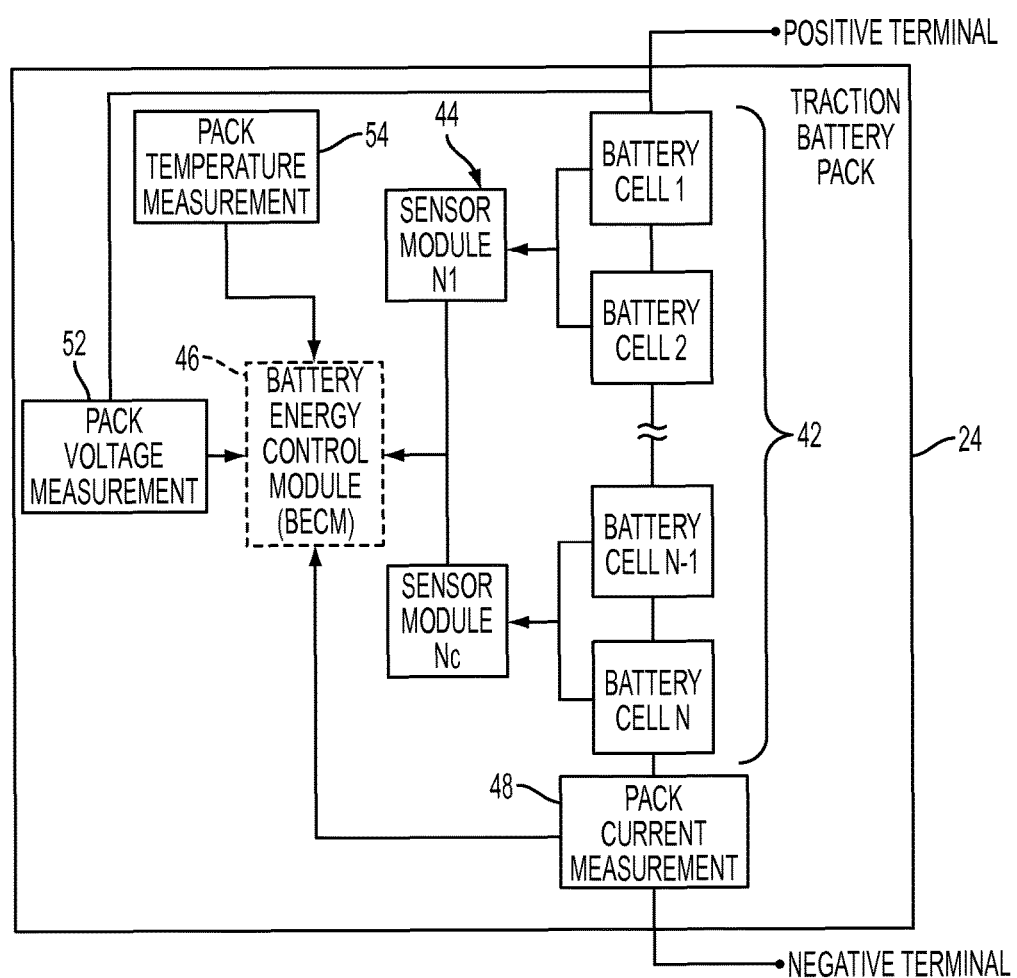
FIG. 2 is a block diagram of a traction battery pack having a BECM with PTC devices for battery thermal conditioning according to embodiments of this disclosure.

Vehicle traction battery packs may be constructed from a variety of chemical formulations. Typical battery pack chemistries include lead-acid, nickel-metal hydride (NIMH), or Lithium-Ion. FIG. 2 shows a typical battery pack 24 in a simple series configuration of N battery cells 42. Other battery packs, however, may be composed of any number of individual battery cells connected in series, in parallel, or some combination thereof. As previously described, a typical system may have one or more controllers, such as a Battery Energy Control Module (BECM) 46, that monitor and control the performance of the battery pack 24. The BECM 46 may monitor several battery pack bulk characteristics such as pack current 48, pack voltage 52 and pack temperature 54. The BECM 46 may have non-volatile memory such that data may be retained when the BECM is in an off condition.

The BECM 46 may include hardware and/or software to control various battery functions, such as battery cell charge balancing and battery thermal conditioning, for example. As generally understood by those of ordinary skill in the art, charge balancing may be more important for some battery chemistries than others, but is performed to balance the individual charges of each battery cell by discharging cells that are charged above a desired threshold level, and charging cells that have a charge below the desired threshold level. As described in greater detail below with reference to FIGS. 3 and 4, BECM 46 may include PTC components to provide battery thermal conditioning during battery cell charge balancing, or during other functions controlled by BECM 46.

In addition to monitoring the battery pack bulk characteristics, BECM 46 may also monitor and/or control cell-level characteristics, such as individual or grouped cell voltages that may be used during charge balancing. For example, the terminal voltage, current, and temperature of each cell may be measured. A battery controller 46 may include voltage monitoring circuits or sensor modules 44 to measure the voltage across the terminals of each of the N cells 42 of the battery pack 24. The voltage monitoring circuits 44 may be implemented by a network of resistors and capacitors configured to provide proper scaling and filtering of the cell voltage signals. One or more of the voltage monitoring circuits 44 may include PTC components for battery thermal conditioning in various embodiments of this disclosure. The voltage monitoring circuits 44 may also provide isolation so that high-voltages will not damage other circuitry with the BECM 46.

Figure 3:
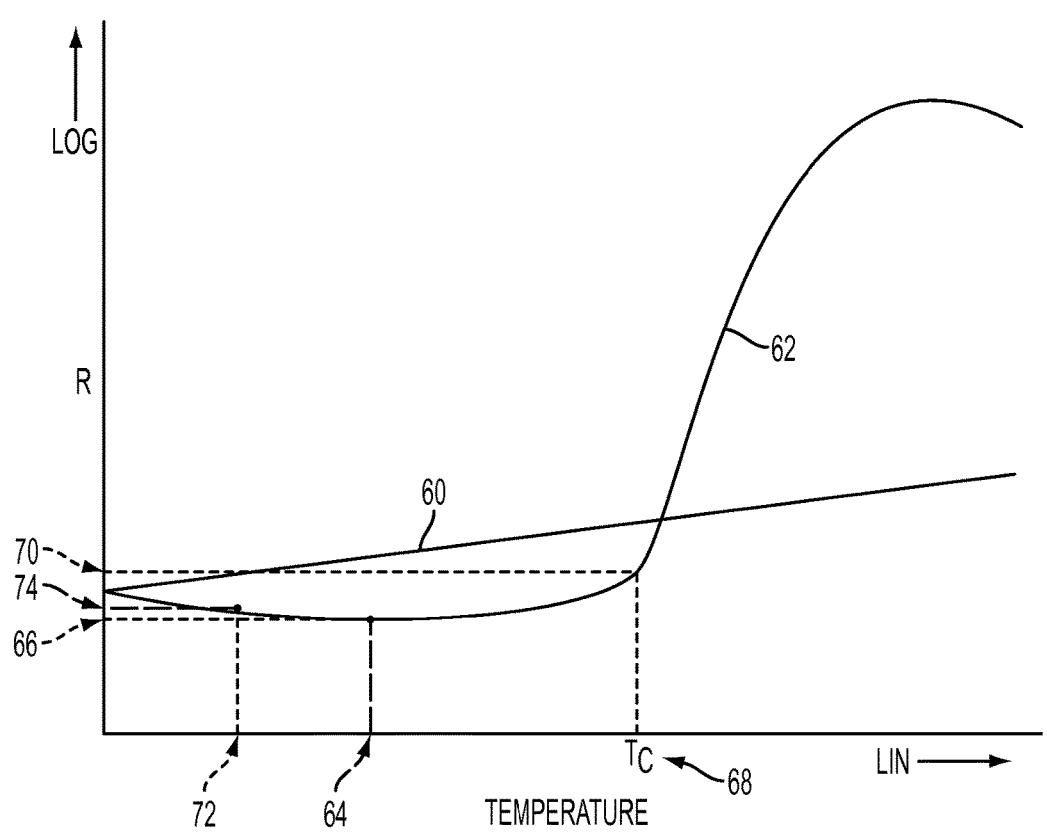
FIG. 3 is a graph illustrating representative characteristics of a thermistor and silistor.

FIG. 3 illustrates operating characteristics of representative PTC devices for use in battery thermal conditioning of various embodiments of this disclosure. FIG. 3 illustrates resistance characteristics as a function of temperature for a generally linear silistor as represented by line 60 and a switching-type PTC thermistor as represented by line 62. Resistance (R) is plotted on a log scale as a function of temperature (T) plotted on a linear scale. As shown, the silistor characteristic 60 generally increases linearly with increasing temperature, although it may begin exhibiting decreasing resistance above a temperature threshold (150° C. for example). A switching-type PTC device characteristic 62 may exhibit slightly decreasing resistance until it reaches a minimum resistance temperature 64 associated with a minimum resistance 66, at which point the PTC thermistor begins to exhibit a slightly positive temperature coefficient up to the critical temperature ($T_c$) 68 (having an associated resistance indicated at 70) where the positive temperature coefficient increases significantly. Above the critical temperature $T_c$, the resistance (R) may increase by orders of magnitude for small increases in temperature (T). The increased resistance reduces current flow such that the device exhibits a self-regulating characteristic. The PTC devices may be specified by their resistance 74 at a particular temperature 72 (typically 25° C.). The electrical power input to the PTC device may be represented by:

$$P_E = IV = I^2 R_{Fn(T)}$$

where I represents current, V represents the voltage drop across the device, and R represents the resistance, which varies as a function of temperature T. The power loss is converted to heat, some of which is transferred to the battery cells as described with reference to FIG. 4.

Figure 4:
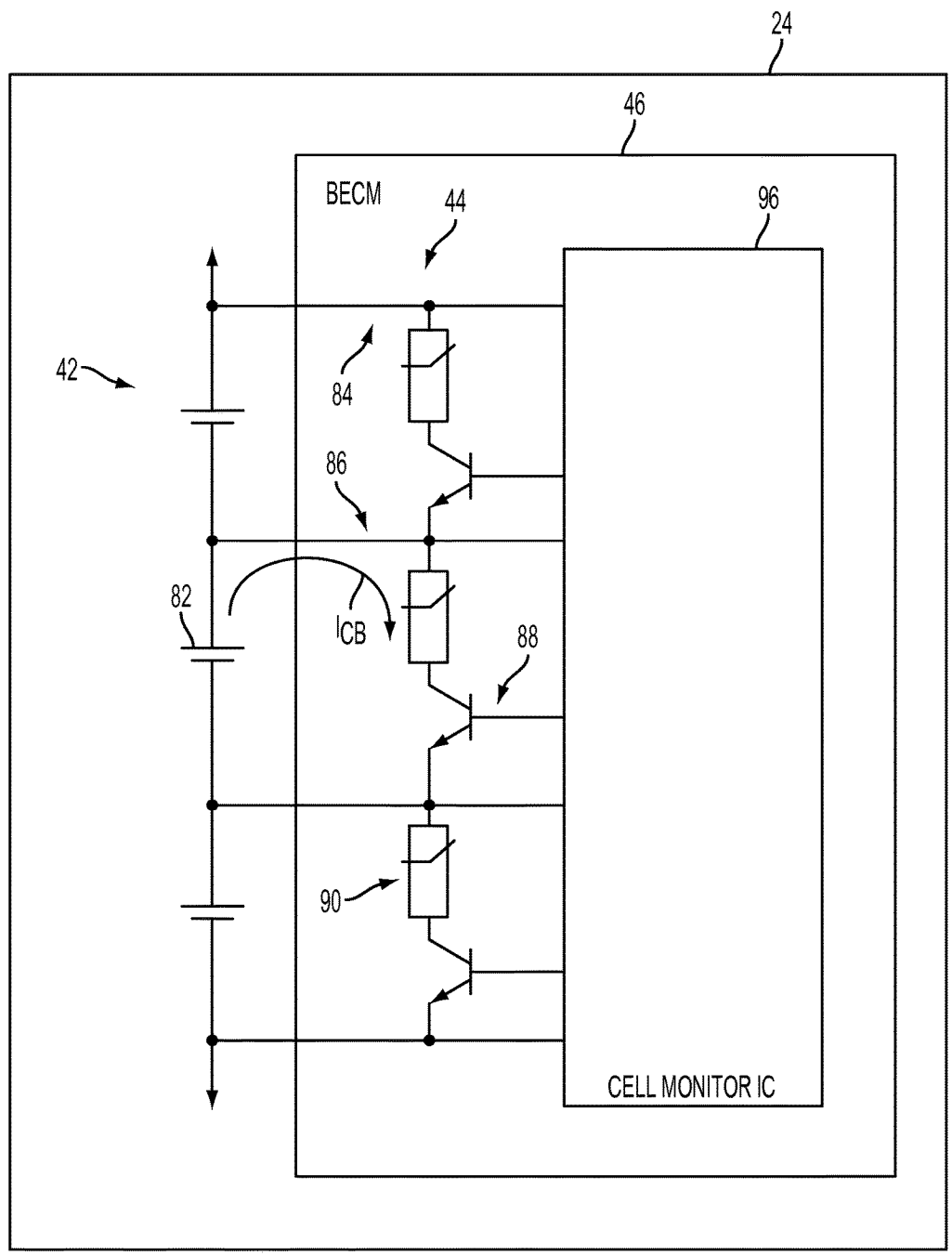
FIG. 4 is a block diagram of a BECM illustrating use of PTC devices associated with each cell of a battery pack to provide battery thermal conditioning according to various embodiments of this disclosure.

Referring now to FIG. 4, a block diagram of a representative battery pack 24 having PTC components or devices for battery thermal conditioning according to embodiments of this disclosure is shown. Battery pack 24 includes a plurality of battery cells 42. Although only three cells are shown, those of ordinary skill in the art will recognize that traction battery packs often include dozens or hundreds of cells. Likewise, although cells 42 are illustrated as individual cells 82 connected in series and having voltage sense leads 84, 86 and a charge balance switching connection 88, other arrangements may be provided depending on the particular application and implementation. As such, battery thermal conditioning according to embodiments of this disclosure may be applied to various other types of arrangements or groupings of individual battery cells 82.

BECM 46, or one or more similar controllers, may be located within battery pack 24. Alternatively, BECM 46 may be located outside of battery pack 24, but controlling one or more PTC devices 90 disposed within battery pack 24. Replacing one or more conventional charge balance resistors disposed within battery pack 24 with PTC devices 90 may provide various advantages with respect to reducing the overall component count, weight, etc. while leveraging the functionality of PTC devices to provide thermal conditioning in addition to cell charge balancing. Each cell 82 may include an associated voltage sense device 86 and charge balance switch 88, implemented by a transistor or similar device activated by hardware and/or software control logic within a cell monitor integrated circuit (IC) 96. Cell monitor IC 96 measures individual cell voltages, reports cell voltages to control logic within BECM 46, and periodically performs cell balancing and/or thermal conditioning. As previously described, cell charge balancing may be performed by dissipating cell energy (via current $I_{CB}$) through a resistive load provided by an associated PTC device, such as PTC device 90. Appropriate selection of the PTC device characteristics as described with reference to FIG. 3 may be used to provide desired heating of associated cells 82 within battery pack 24. The BECM strategy can adjust the normal charge-balancing algorithms by compensating for temperature, knowing the resistance-temperature characteristics of the PTC devices, as the actual amount of charge-balance current varies with temperature.

While conventional battery packs may include resistors used for charge balancing, any associated energy loss dissipated as heat is generally minimized by design. As such, these designs dissipate less heat and heating occurs much more slowly than the heat dissipated by PTC devices according to embodiments of this disclosure.

As generally illustrated in FIGS. 1-4 a system or method for thermal battery conditioning using PTC components positioned within a vehicle traction battery is shown. As previously described, the PTC components may be positioned in charge balance circuitry within a battery controller, which is disposed within the vehicle battery pack. Alternatively, the PTC thermistors, or silistors may be external to the battery controller, but positioned to transfer heat to proximate battery cells within the battery pack. In operation, one or more controllers may process a thermal conditioning command in response to ambient temperature being below an associated threshold. The controller(s) provide a signal to one or more switches to enable current to flow from an associated battery cell through a PTC device to heat the associated battery cell. The controller may select particular cells for thermal conditioning based on cell temperature, cell charge, or other operating parameters.

As those of ordinary skill in the art will recognize, various embodiments of this disclosure have associated advantages. For example, battery thermal condition using PTC components within the traction battery facilitates more rapid battery cell heating, particularly at extremely low temperatures as compared to heating provided by conventional charge balance circuitry. Use of internal or integrated PTC components does not depend upon external thermal conditioning (electrical, fluid, air) to condition the battery pack. In addition, the PTC devices offer a self-regulating thermal protection for the battery cells as temperature for any particular cell or group of cells exceeds the switching or critical temperature of associated PTC devices. Thermal conditioning of the traction battery pack using embedded PTC devices provides self-heating of the pack (cells and components) at low temperatures and improved temperature compensated cell charge balancing performance. For embodiments that replace conventional resistors with PTC components, no additional circuits or components are needed for thermal conditioning, which may reduce cost and complexity.

While exemplary embodiments are described above, it is not intended that these embodiments describe all possible embodiments within the scope of the disclosure. Rather, the words used in the specification are words of description rather than limitation, and it is understood that various changes may be made without departing from the spirit and scope of the disclosure. Additionally, the features of various embodiments may be combined to form further embodiment even though particular combinations are not explicitly described or illustrated.

While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not outside the scope of the disclosure and may be desirable for particular applications.

What is claimed is:

1. A vehicle traction battery, comprising:
   a plurality of battery cells;
   a battery energy control module in communication with the plurality of battery cells; and
   charge-balancing circuitry associated with the plurality of battery cells, the charge-balancing circuitry including positive temperature coefficient thermistors positioned within the traction battery to provide thermal conditioning to the plurality of battery cells in response to a current applied to the charge-balancing circuitry.

2. The vehicle traction battery of claim 1 wherein the charge-balancing circuitry is disposed within the battery energy control module.

3. The vehicle traction battery of claim 1 wherein the positive temperature coefficient thermistors comprise silistors.

4. The vehicle traction battery of claim 1 wherein the positive temperature coefficient thermistors comprise switching thermistors.

5. The vehicle traction battery of claim 1 wherein the battery energy control module is configured to activate the charge-balancing circuitry in response to temperature being below an associated threshold.

6. The vehicle traction battery of claim 1 wherein the battery energy control module is configured to adjust charge-balancing current in response to cell temperature during cell charge balancing.

7. The vehicle traction battery of claim 1 wherein each of the plurality of battery cells is connected in parallel with a corresponding one of the positive temperature coefficient thermistors.

8. The vehicle traction battery of claim 1 wherein each of the plurality of battery cells has corresponding charge-balancing circuitry including at least one positive temperature coefficient device.

9. A vehicle having an electric motor/generator powered by a traction battery, comprising:
   battery cells;
   positive temperature coefficient (PTC) thermistors disposed within charge balancing circuitry of the traction battery; and
   a battery control module (BCM) disposed within the traction battery and in communication with the battery cells and the thermistors, the BCM configured to supply current from the battery cells to the thermistors to provide battery thermal conditioning during charge balancing of the battery cells.

10. The vehicle of claim 9 wherein each of the thermistors is disposed within a corresponding charge balancing circuit associated with corresponding ones of the battery cells.

11. The vehicle of claim 9 wherein the thermistors comprise switching thermistors.

12. The vehicle of claim 9 wherein the thermistors comprise silistors.

13. The vehicle of claim 9 wherein the BCM compensates battery cell charge balancing based on battery cell temperature and a resistance-temperature characteristic of the thermistors.

14. The vehicle of claim 9 wherein each of the thermistors is connected across a corresponding one of the battery cells.

15. A vehicle traction battery, comprising:
   a plurality of battery cells; and
   a battery energy control module (BECM) disposed within the vehicle traction battery and having charge balancing circuitry including at least one positive temperature coefficient component connected to at least one of the plurality of battery cells for thermal conditioning of the plurality of battery cells during charge balancing of the plurality of battery cells.

16. The vehicle traction battery of claim 15 wherein the charge balancing circuitry is connected across associated ones of the plurality of battery cells.

17. The vehicle traction battery of claim 15 wherein the at least one positive temperature coefficient component comprises a thermistor.

18. The vehicle traction battery of claim 15 wherein the at least one positive temperature coefficient component comprises a silistor.

19. The vehicle traction battery of claim 15 wherein the charge balancing circuitry comprises a positive temperature coefficient thermistor for each of the plurality of battery cells.

* * * * *